US012674702B2

(12) United States Patent (10) Patent No.: US 12,674,702 B2

Zhang et al. (45) Date of Patent: Jul. 7, 2026

(54) SOUND EVENT EARLY DETECTION

(71) Applicant: NEC Laboratories America, Inc., Princeton, NJ (US)

(72) Inventors: Xuchao Zhang, Elkridge, MD (US); Yuncong Chen, Plainsboro, NJ (US); Haifeng Chen, West Windsor, NJ (US); Wenchao Yu, Plainsboro, NJ (US); Wei Cheng, Princeton Junction, NJ (US); Xujiang Zhao, Plano, TX (US)

(73) Assignee: NEC Corporation, Tokyo (JP)

( * ) Notice: Subject to any disclaimer, the term of this patent is extended or adjusted under 35 U.S.C. 154(b) by 975 days.

(21) Appl. No.: 17/892,192

(22) Filed: Aug. 22, 2022

(65) Prior Publication Data

US 2023/0074002 A1     Mar. 9, 2023

Related U.S. Application Data

(60) Provisional application No. 63/252,641, filed on Oct. 6, 2021, provisional application No. 63/237,569, filed on Aug. 27, 2021.

(51) Int. Cl.
| | |
|---|---|
| *G01H 3/08* | (2006.01) |
| *G06N 3/045* | (2023.01) |

(52) U.S. Cl.
CPC .............. *G01H 3/08* (2013.01); *G06N 3/045* (2023.01)

(58) Field of Classification Search
CPC ............ G01H 3/08; G06N 3/045; G06N 3/09; G06N 3/048; G06N 7/01; G06N 3/0442
See application file for complete search history.

(56) References Cited

U.S. PATENT DOCUMENTS

| | | | | |
|---|---|---|---|---|
| 10,803,885 | B1 * | 10/2020 | Kao ........................ | G06N 3/045 |
| 10,878,840 | B1 * | 12/2020 | Mitchell ................. | G10L 25/51 |
| 2009/0271358 | A1 * | 10/2009 | Lindahl .................... | G06N 7/01 |
| | | | | 706/51 |
| 2019/0049989 | A1 * | 2/2019 | Akotkar ............... | G05D 1/0088 |
| 2020/0074985 | A1 * | 3/2020 | Clark ...................... | G10L 25/24 |
| 2021/0360349 | A1 * | 11/2021 | Nyayate ................. | G10L 25/84 |
| 2023/0062528 | A1 * | 3/2023 | Rao ....................... | A61B 5/7267 |

OTHER PUBLICATIONS

Cheng, Mingxi, et al. There Is Hope After All: Quantifying Opinion and Trustworthiness in Neural Networks. 2020. Frontiers in Artificial Intelligence. vol 3. <URL: https://www.frontiersin.org/journals/artificial-intelligence/articles/10.3389/frai.2020.00054> <DOI: 10.1016/S1470-2045(00)00015-2> (Year: 2020).*

(Continued)

*Primary Examiner* — Cesar B Paula
*Assistant Examiner* — Harrison C Kim
(74) *Attorney, Agent, or Firm* — Vincent Duffy

(57) ABSTRACT

Systems and methods for Evidence-based Sound Event Early Detection is provided. The system/method includes parsing collected labeled audio corpus data and real time audio streaming data utilizing mel-spectrogram, encoding features of the parsed mel-spectrograms using a trained neural network, and generating a final predicted result for a sound event based on the belief, disbelief and uncertainty outputs from the encoded mel-spectrograms.

20 Claims, 6 Drawing Sheets

(56) References Cited

OTHER PUBLICATIONS

E. Rashno, A. Akbari and B. Nasersharif, "A Convolutional Neural Network model based on Neutrosophy for Noisy Speech Recognition," 2019 4th International Conference on Pattern Recognition and Image Analysis (IPRIA), Tehran, Iran, 2019, pp. 87-92, doi: 10.1109/PRIA.2019.8786010. (Year: 2019).*

Mesaros, A., Diment, A., Elizalde, B., Heittola, T., Vincent, E., Raj, B., & Virtanen, T. (Mar. 25, 2019). Sound event detection in the DCASE 2017 challenge. IEEE/ACM Transactions on Audio, Speech, and Language Processing, 27(6), (pp. 992-1006).

Miyazaki, K., Komatsu, T., Hayashi, T., Watanabe, S., Toda, T., & Takeda, K. (Nov. 2, 2020), Conformer-based sound event detection with semi-supervised learning and data augmentation. dim, 1, 4. (pp. 1-5).

Viet, Q. N., Kang, H., Chung, S. T., Cho, S., Lee, K., & Seol, T. (Oct. 16, 2013). Real-time audio surveillance system for PTZ camera. In 2013 International Conference on Advanced Technologies for Communications (ATC 2013) (pp. 392-397). IEEE.

Phan, H., Maass, M., Mazur, R., & Mertins, A. (Jun. 29, 2015). Early event detection in audio streams. In 2015 IEEE International Conference on Multimedia and Expo (ICME) (pp. 1-6). IEEE.

Phan, H., Koch, P., McLoughlin, I., & Mertins, A. (Apr. 15, 2018). Enabling early audio event detection with neural networks. In 2018 IEEE International Conference on Acoustics, Speech and Signal Processing (ICASSP) (pp. 141-145). IEEE.

McLoughlin, I. V., Song, Y., Pham, L. D., Palaniappan, R., Phan, H., & Lang, Y. (Sep. 6, 2018). Early detection of continuous and partial audio events using CNN. In Proceedings of Interspeech (vol. 2018, pp. 3314-3318). International Speech Communication Association.

Zhao, X., Chen, F., Hu, S., & Cho, J. H. (Dec. 6, 2020). Uncertainty aware semi-supervised learning on graph data. Advances in Neural Information Processing Systems, 33, (pp. 12827-12836).

Sensoy, M., Kaplan, L., & Kandemir, M. (Dec. 3, 2018). Evidential deep learning to quantify classification uncertainty. Advances in neural information processing systems, 31. (pp. 1-11).

Audun. Jsang. (2018). Subjective Logic: A formalism for reasoning under uncertainty. Springer. (pp. 1-69).

Josang, A., Cho, J. H., & Chen, F. (Jul. 10, 2018). Uncertainty characteristics of subjective opinions. In 2018 21st International Conference on Information Fusion (FUSION) (pp. 1998-2005). IEEE. (pp. 1-8).

Xu, L., Zhang, X., Zhao, X., Chen, H., Chen, F., & Choi, J. D. (Sep. 1, 2021). Boosting cross-lingual transfer via self-learning with uncertainty estimation. arXiv preprint arXiv:2109.00194.

Shi, W., Zhao, X., Chen, F., & Yu, Q. (Dec. 6, 2020). Multifaceted uncertainty estimation for label-efficient deep learning. Advances in neural information processing systems, 33,(pp. 17247-17257).

Hu, Y., Ou, Y., Zhao, X., Cho, J. H., & Chen, F. (May 18, 2021). Multidimensional uncertainty-aware evidential neural networks. In Proceedings of the AAAI Conference on Artificial Intelligence (vol. 35, No. 9, pp. 7815-7822).

Turpault, N., Serizel, R., Salamon, J., & Shah, A. P. (Oct. 25, 2019). Sound event detection in domestic environments with weakly labeled data and soundscape synthesis. (pp. 1-5).

Hershey, S., Ellis, D. P., Fonseca, E., Jansen, A., Liu, C., Moore, R. C., & Plakal, M. (Jun. 6, 2021). The benefit of temporally-strong labels in audio event classification. In ICASSP 2021-2021 IEEE International Conference on Acoustics, Speech and Signal Processing (ICASSP) (pp. 366-370). IEEE.

Salamon, J., MacConnell, D., Cartwright, M., Li, P., & Bello, J. P. (Oct. 15, 2017), Scaper: A library for soundscape synthesis and augmentation. In 2017 IEEE Workshop on Applications of Signal Processing to Audio and Acoustics (WASPAA) (pp. 344-348). IEEE.

Gal, Y., & Ghahramani, Z. (Jun. 11, 2016). Dropout as a bayesian approximation: Representing model uncertainty in deep learning. In international conference on machine learning (pp. 1050-1059). PMLR.

Depeweg, S., Hernandez-Lobato, J. M., Doshi-Velez, F., & Udluft, S. (Jul. 3, 2018). Decomposition of uncertainty in Bayesian deep learning for efficient and risk-sensitive learning. In International Conference on Machine Learning (pp. 1184-1193). PMLR.

Gal, Y., & Ghahramani, Z. (Jun. 6, 2015). Bayesian convolutional neural networks with Bernoulli approximate variational inference. arXiv preprint arXiv:1506.02158. (pp. 1-12).

Turpault, N., & Serizel, R. (Jul. 8, 2020). Training sound event detection on a heterogeneous dataset. arXiv preprint arXiv:2007.03931. (pp. 1-5).

* cited by examiner

110 — COLLECT LABELED AUDIO CORPUS DATA

120 — RECORD REAL-TIME AUDIO STREAMING DATA

130 — USE MEL-SPECTROGRAM TO PARSE AUDIO DATA

140 — PARSE EACH AUDIO FRAME WITH ZERO PADDED FRAMES

150 — ENCODE AUDIO FEATURES WITH NEURAL NETWORK

160 — APPLY GROUND TRUTH LABELS TO TRAIN ENCODER AND DETECTION

SOUND EVENT EARLY DETECTION

RELATED APPLICATION INFORMATION

This application claims priority to Provisional Application No. 63/237,569, filed on Aug. 27, 2021, and Provisional Application No. 63/252,641, filed on Oct. 6, 2021, both incorporated herein by reference in its entirety.

BACKGROUND

Technical Field

The present invention relates to Sound event detection (SED) and more particularly Sound event detection (SED) that utilizes Subjective Logic and Evidential Uncertainty.

Description of the Related Art

Sound is everywhere, and sound events can occur in many different environments. Sound event detection can try to classify a sound and determine its location. Sound event detection (SED) can be categorized into offline sound event detection and online sound event detection. Offline sound event detection methods, they are designed to assume that the entire sound event is fully observed. Online sound event detection, which requires ongoing events to be recognized as early as possible, can be used for real-time responses to events when they happen, for example, avoidance of unscheduled outages, but this can be sensitive to background noise.

SUMMARY

According to an aspect of the present invention, a method is provided for Evidence-based Sound Event Early Detection. The method includes parsing collected labeled audio corpus data and real time audio streaming data utilizing mel-spectrogram, encoding features of the parsed mel-spectrograms using a trained neural network, and generating a final predicted result for a sound event based on the belief, disbelief and uncertainty outputs from the encoded mel-spectrograms.

According to another aspect of the present invention, a computer system is provided for Evidence-based Sound Event Early Detection. The computer system includes one or more processors, a display screen coupled to the one or more processors through a bus, and memory coupled to the one or more processors through the bus, wherein the memory includes an audio processing tool configured to parse collected labeled audio corpus data and real time audio streaming data utilizing mel-spectrogram, an audio encoding tool configured to encode features of the parsed mel-spectrograms using a trained neural network, and a sound detection tool configured to generate a final predicted result for a sound event based on the belief, disbelief and uncertainty outputs from the encoded mel-spectrograms.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with embodiments of the present invention, systems and methods are provided for Sound event early detection (SEED) with a Multi-label Evidential Neural Network to estimate the Beta distribution instead of the class probability such that evidential uncertainty can be estimated for each prediction. A Multi-label Evidential Neural Network (ML-ENN) algorithm with a backtrack inference method is provided.

Given a stream of audio data, each sound event can be detected with reduced detection delay. A sound event can be, for example, a steam leak in a power plant, a steel or concrete support cracking during an earthquake, an explosion, or someone breaking into a building. A mobile device, for example, a smartphone may use the early sound detection of the sound event through the device microphone to detect such occurrences. The sound event may be detected over background noise that would otherwise mask the occurrence of the event. There may be a small detection window before an event becomes catastrophic. It is difficult to detect target event due to overlapping of polyphony sound. The frequency and amplitude for each event can be manually chosen.

Embodiments of the present invention relate to an Evidence-based Sound Event Early Detection task (SEED) to address the sound event detection problem at early stage, for example, less than 60 milliseconds.

In one or more embodiments, the Multi-label Evidential neural network model can significantly reduce the detection delay and improve the prediction accuracy. The evidence information (include belief, disbelief and uncertainty) can help human being to make better decision, where Evidence can be a measure of the amount of support for a certain class.

A novel self-training framework is proposed to improve the performance of the cross-lingual zero-shot transfer task.

A novel uncertainty estimation method is proposed to combine the epistemic uncertainty and the multi-lingual transfer uncertainty to find the reliable pseudo labels for iterative training of the pseudo-labeled data.

It is to be understood that aspects of the present invention will be described in terms of a given illustrative architecture;

however, other architectures, structures, and method features and steps can be varied within the scope of aspects of the present invention.

Figure 1:
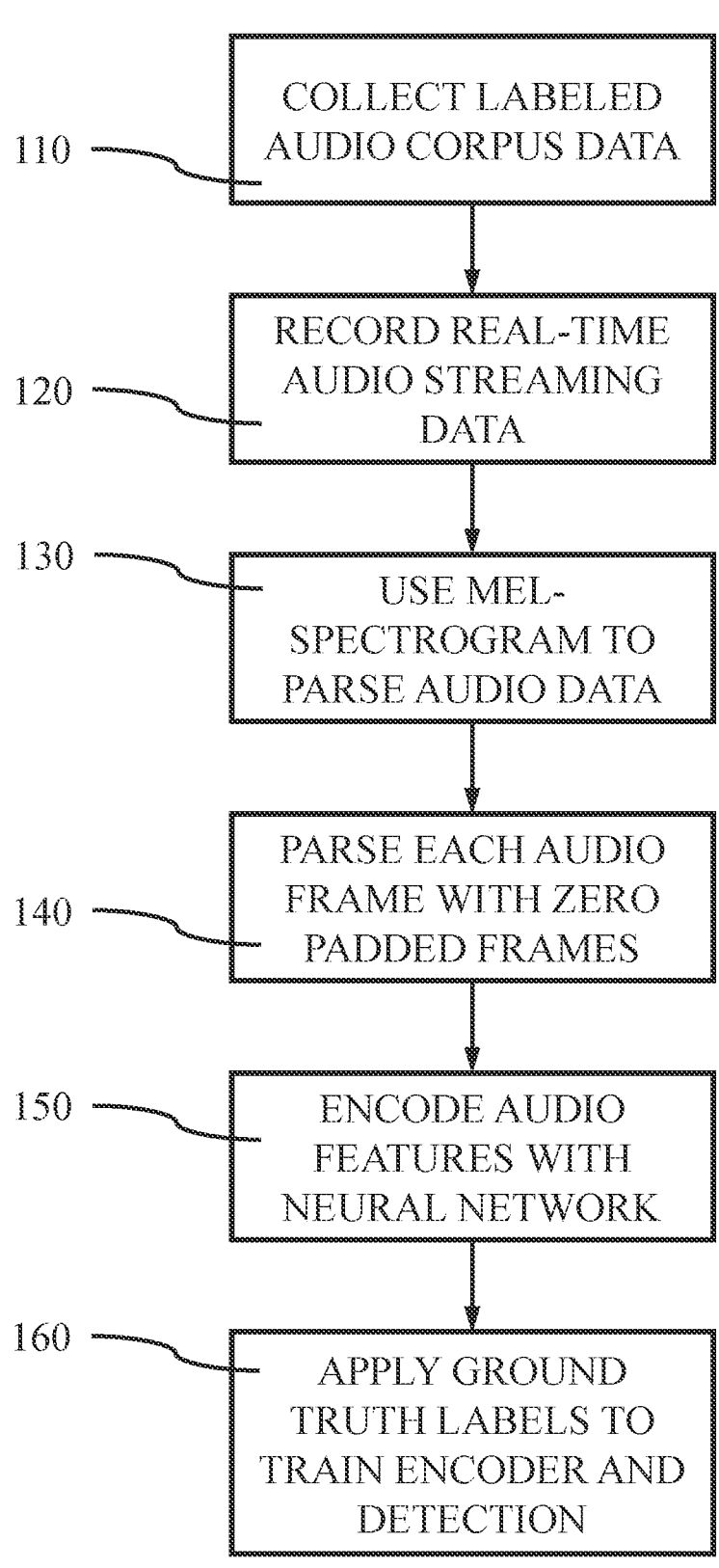
FIG. 1 is a block/flow diagram illustrating a high-level system/method for an Evidence-based Sound Event Early Detection task, in accordance with an embodiment of the present invention.

Referring now in detail to the figures in which like numerals represent the same or similar elements and initially to FIG. 1, a high-level system/method for an Evidence-based Sound Event Early Detection task is illustratively depicted in accordance with an embodiment of the present invention.

In one or more embodiments, an Evidence-based Sound Event Early Detection task (SEED) can address the sound event detection problem at early stage. On or more neural networks can be trained to perform the Evidence-based Sound Event Early Detection task.

At block 110, audio corpus data including a set of strongly-labeled data with both sound event onset and offset labels can be collected.

At block 120, real-time audio data can be recorded by audio frames for a sound event early detection task.

At block 130, mel-spectrogram can be used to parse the original waveform audio data into spectrogram features.

At block 140, each frame of audio data can be parsed by mel-spectrogram with zero-padded frames.

At block 150, the audio features can be encoded, for example, using a convolutional neural network with a gated recurrent unit (GRU) recurrent neural network.

At block 160, the ground-truth onset and offset labels can be applied to train both the audio encoder and evidential sound event detection model for the sound early detection task.

In various embodiments, a final predicted result can be generated for the sound event based on the belief, disbelief and uncertainty outputs. The final predicted result can be generated by the trained convolutional neural network with a gated recurrent unit (GRU) recurrent neural network.

Figure 2:
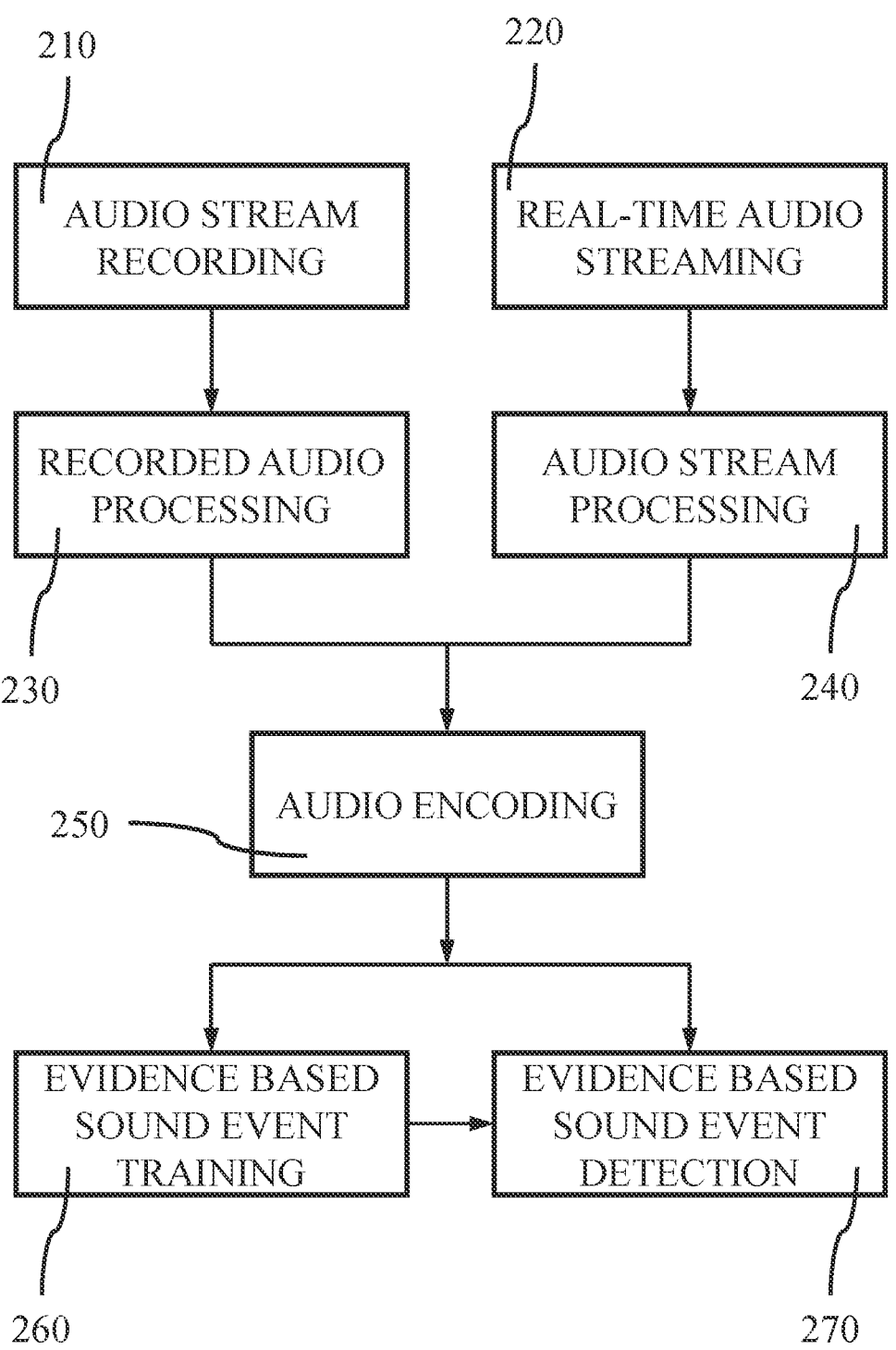
FIG. 2 is a block/flow diagram illustrating a system/method for both training and real-time testing audio, in accordance with an embodiment of the present invention.

FIG. 2 is a block/flow diagram illustrating a system/method for both training and real-time testing audio, in accordance with an embodiment of the present invention.

At block 210, audio corpus data including a set of strongly labeled data with both sound event onset and offset labels can be processed. Besides the strong labels, the weakly-labeled data (sound event label for the whole audio) and unlabeled data can also be included in the dataset.

The dataset can include, for example, 10 classes of sound events. The training set can contain 10,000 synthetic audio clips with strong-label, 1578 weak-label audio clips, and 14,412 unlabeled audio clips. The validation set can include 1168 audio clips that are annotated with strong-label (timestamps obtained by human annotators). The test set can include 1,016 real-world audio clips.

At block 220, the real-time audio data for sound event early detection task can be recorded. The audio data is collected frame by frame, and usually the frame size is small enough to detect the sound event at an early stage, for example, the frame size can be 64 milliseconds. The test inference time of our approach is around 5 ms, less than the streaming segment duration (60 ms), which indicates that our method satisfies the real-time requirement.

At block 230, mel-spectrogram can be used to parse the original wave-form audio data into the spectrogram features. Specifically, the wave form data is parsed to spectrum first by Fourier transform then map the powers of the spectrum into mel scale. After that, a log of powers operation can be taken at each of the mel frequencies. The mel-spec can be applied to both corpus and real-time audio, as their preprocessing step.

A Mel spectrogram is a spectrogram that is converted to a Mel scale, in which a spectrogram is a visualization of the frequency spectrum of a signal, where the frequency spectrum of a signal is the frequency range that is contained by the signal.

The input features used can be log-mel spectrograms extracted from the audio signal resampled to 16000 Hz. The log-mel spectrogram can use 2048 STFT windows with a predefined hop size of 256 and 128 Mel-scale filters. As a result, each 10-second sound clip may be transformed into a 2D time frequency representation with a size of (626×128). At the training stage, the input can be the full 10-second sound clip. At the test stage, we consider a stream setting where the 10-second sound clip is decomposed to 156 segments, and the input data segment collected in a streaming way.

At block 240, each audio frame data can be parsed by mel-spectrogram, but the frame is padded by additional zeros as a longer window size compared to the hop size. If the size the audio frame is smaller than the hop size, then the frame will be padded with additional zeros to the predefined hop size.

At block 250, the audio features can be encoded by a convolutional neural network with GRU recurrent neural network based on the mel-spectrogram features generated at block 230 and 240. Encoding is applied to the output of mel-spec. It can be applied to both corpus and real-time audio data.

At block 260, based on the audio features generated at block 250, the ground-truth onset and offset labels can be applied to train both the audio encoder and evidential sound event detection model for sound early detection task.

At block 270, based on the evidential neural network trained at block 260, this generates the final predicted result for the sound event based on the belief, disbelief and uncertainty outputs, that is: 1) when belief>disbelief and 2) uncertainty<threshold. When the two requirements are satisfied, the event is predicted/identified as occurring.

We first define the true positive prediction for the event k only happened when the first prediction timestamp $d_p$ is located into event happened intervals. In addition, we set an early predict tolerance L that if the first prediction is earlier than true event occurred. Otherwise, we consider the prediction for this event 3 of 4 is a false positive.

Figure 3:
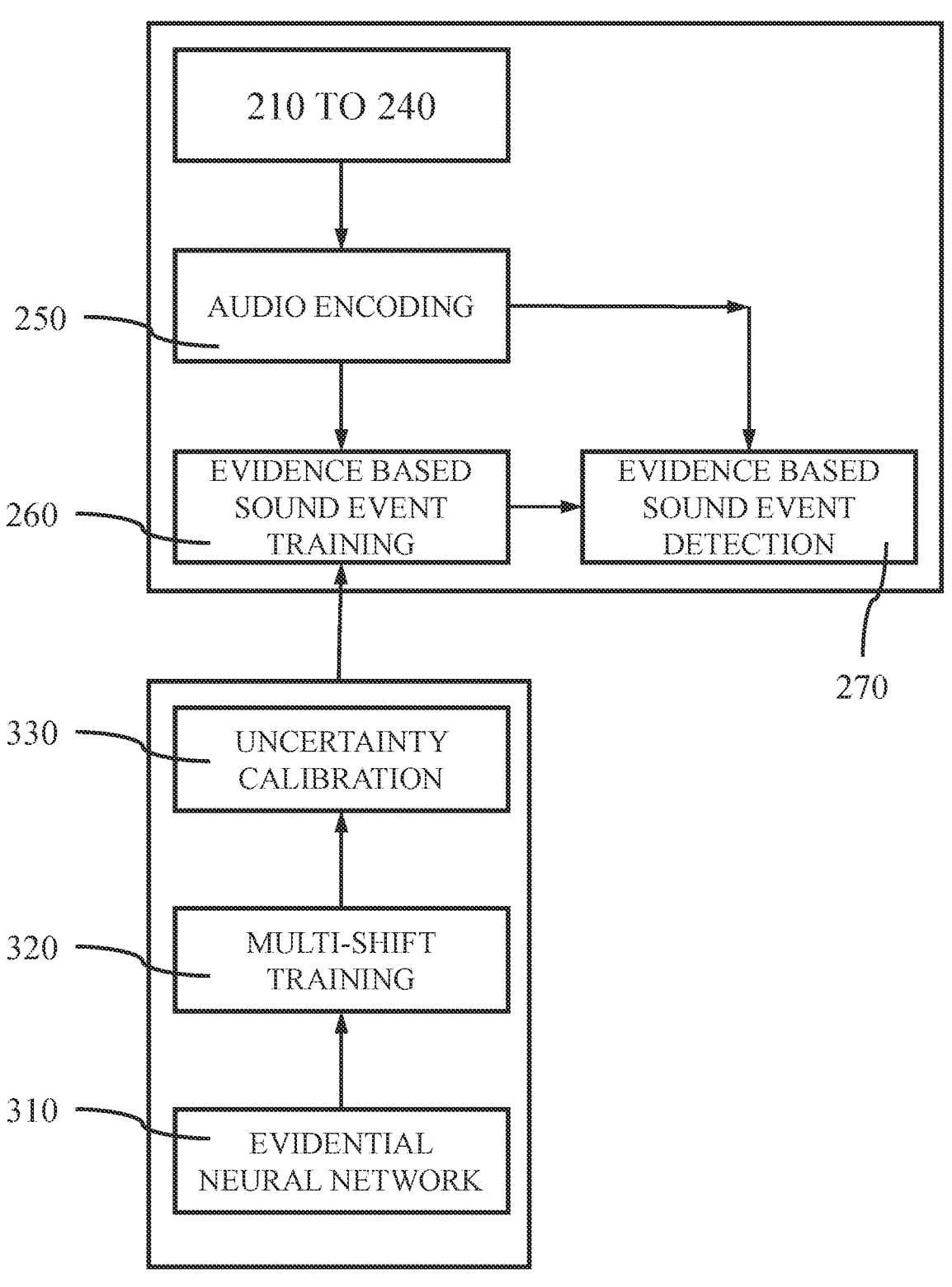
FIG. 3 is a flow diagram illustrating a system/method for training both the audio encoder and the evidential sound event detection model, in accordance with an embodiment of the present invention.

FIG. 3 is a block/flow diagram illustrating a system/method for training both the audio encoder and the evidential sound event detection model, in accordance with an embodiment of the present invention.

At block 310, a multi-label evidential network is designed with a Beta distribution for each class to generate the belief, disbelief and uncertainty results. We choose the cross entropy based on the expected probability, $$\hat{p}_{ik}^{t},$$

as follows:

$$l_{Beta}\left(\alpha_i^t, y_i^t\right) = \sum_{k=1}^{K} y_{ik}^t \log \hat{p}_{ik}^t + \left(1 - y_{ik}^t\right) \log\left(1 - \hat{p}_{ik}^t\right).$$

The probability can be represented by the belief and disbelief as follows:

$$\hat{p}_{ik}^t = \frac{b_{ik}^t}{b_{ik}^t + d_{ik}^t + 2};$$

where $$b_{ik}^t \text{ and } d_{ik}^t$$

represents the belief and disbelief for the k-th class at time t.

At block 320, the multi-shift input can be considered to cover more early-stage information of a predicted event. The loss of multi-shift can be presented as follows:

$$\mathcal{L}_{mr} = \sum_{i=1}^{N} \sum_{m=0}^{M} \sum_{t=m+1}^{T} l_{Beta}(\alpha_{ik}^{[t,t-m]}, y_{ik}^{[t,t-m]});$$

Where the M is the shift scale and y is the ground truth label of multiple segments.

At block 320, the uncertainty estimation can be improved by an uncertainty calibration loss as follows:

$$\mathcal{L}_{un} = \sum_{i=1}^{N} \sum_{m=0}^{M} \sum_{t=m+1}^{T} \sum_{k=1}^{K} \mathbb{1}(x_{ik}^{[t,t-m]}) \cdot U(\alpha_{ik}^{[t,t-m]})$$
$$\text{Where:}$$
$$\mathbb{1}(x_{ik}^{[t,t-m]}) = \begin{cases} 1, & \text{correct prediction} \\ -1, & \text{incorrect prediction} \end{cases}$$

The uncertainty calibration loss is to help calibrating the uncertainty estimation based on the ground-truth labels. In training phase, for all correct prediction samples, we push the uncertainty decreases; for all incorrect prediction samples, the loss makes the uncertainty increase.

In various embodiments, the uncertainty can be increased when prediction is incorrect, and decreased when the uncertainty prediction is correct. Uncertainty Calibration improves the uncertainty estimation.

Subjective Logic (SL) defines a subjective opinion by explicitly considering the dimension of uncertainty derived from vacuity (i.e., a lack of evidence). For a given binomial opinion towards proposition, x, an opinion is expressed by two belief masses, for example, belief b and disbelief d, and one uncertainty mass, vacuity, u. Denoting an opinion by w, which is formulated by:

$$\omega = (b, d, u, a);$$

where "b" and "d" can be thought of as: agree vs. disagree, or pro vs. con, on a given proposition. Meanwhile, "a" refers to a base rate representing a prior knowledge without commitment, such as neither agree nor disagree (or neither true or false). We have the property b+d+u=1, and b, d, u, a∈[0, 1]. A binomial subjective opinion can be calculated as follows:

$$b = \frac{r}{r+s+W};$$

-continued
$$d = \frac{s}{r+s+W};$$
$$u = \frac{W}{r+s+W};$$

where r is the amount of positive evidence and s is the amount of negative evidence. W is an amount of uncertainty, evidence where W=2 refers to complete uncertainty in the initial uncertainty (i.e., u=0.5 with r=s=1 and W=2).

An opinion, ω, can be projected onto a single probability distribution by removing the uncertainty mass. To this end, the expected belief probability, p, is defined by: p=b+a·u. A binomial opinion follows a Beta probability density function (pdf), denoted by Beta(p|α, β), where α and β represents the strength of the Beta distribution.

$$\text{Beta }(p \mid \alpha, \beta) = \frac{1}{B(\alpha, \beta)} p^{\alpha-1}(1-p)^{\beta-1};$$

where B(α, β)=Γ(α)Γ(β)/Γ(α+β) and Γ(·) is the gamma function. In SL, α and β are received over time. An opinion w can be obtained based on α and β as ω=(α, β). This can be translated to ω=(b, d, u, a) using the mapping rule in SL.

In this work, we adopt the concept of uncertainty and its variety based on SL in developing an uncertainty-based SEED framework when the input is a streaming audio signal.

Vacuity refers to a lack of evidence, meaning that uncertainty is introduced because of no or insufficient information. High vacuity might happen at the early stage of the sound event, resulting in an over-confidence estimation. The results indicate that probability with low evidence is not reliable (high uncertainty) in the prediction.

Multi-label Evidential Neural Network can be used to estimate the Beta distribution instead of the class probability such that we can estimate evidential uncertainty for each prediction. Based on the intuition of evidential uncertainty in SEED, we propose a new SEED algorithm with reliable prediction.

In probability theory and statistics, the beta distribution is a family of continuous probability distributions defined on the interval [0, 1] and parameterized by two positive shape parameters, denoted by alpha (α) and beta (β), that appear as exponents of the random variable and control the shape of the distribution. The beta distribution is a conjugate prior of binomial distribution.

Figure 4:
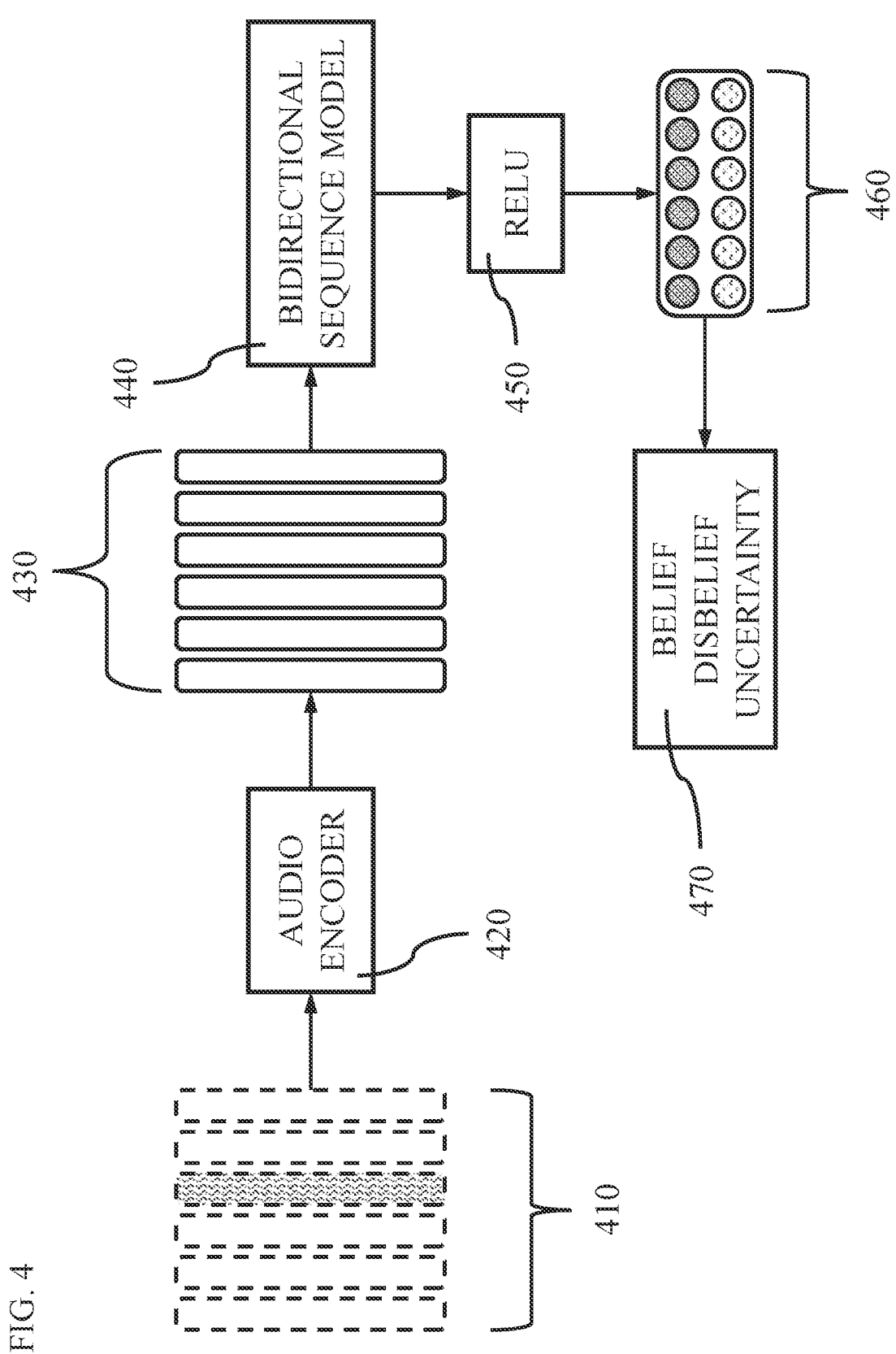
FIG. 4 is a block/flow diagram illustrating an Uncertainty Framework, in accordance with an embodiment of the present invention.

FIG. 4 is a block/flow diagram illustrating an Uncertainty Framework, in accordance with an embodiment of the present invention.

Sound event early detection (SEED) is essential in many real world applications, such as audio surveillance and safety related applications. However, existing methods detect sound events based on probability, which may cause the overconfidence issue at the early stage of an ongoing event and result in an unreliable prediction.

In one or more embodiments, a streaming audio clip 410 decomposed into segments can be inputted sequentially into an audio encoder 420 that generates encoded segments 430, $f(x^{[t-m, t+n]})$. The encoded segments 430 can be fed to a bi-directional sequence model 440 that provides output to a ReLU 450. A Beta distribution 460 with negative evidence and positive evidence can be generated, and provide values 470 for belief, disbelief and uncertainty.

In one or more embodiments, an audio clip, "x", can be decomposed into T segments, $x=[x^1, \ldots, x^T]$ and the audio in a stream collected. The corresponding label is denoted as $y=[y^1, \ldots, y^T]$, where $y^t=[y_1^t, \ldots, y_K^t]$, and $y_k^t=\{0, 1\}$.

For polyphonic sound event detection, most existing methods would consider a binary classification for each class, such as sigmoid or softmax output. Evidential uncertainty can be derived from binomial opinions or equivalently Beta distributions to model a probability distribution for the class probabilities. Therefore, we design a Multi-Label Evidential Neural Network (ML-ENN), f, to form their binomial opinions for the class-level Beta distribution Beta $(p_k|\alpha_k, \beta_k)$ of a given audio segment, $x^t$. In addition, a context of m frames is considered for sequential input purpose. Then, the conditional probability $P(p_k^t|x^{[t-m,t]}; \theta)$ of class k can be obtained by:

$$P(p_k^t \mid x^{[t-m,t]}; \theta) = \text{Beta}(p_k^t \mid \alpha_k^t, \beta_k^t),$$
$$\alpha_k^t, \beta_k^t = f_k(x^{[t-m,t]}; \theta),$$

where $f_k$ is the output of ML-ENN for class k, and $\theta$ is the model parameters.

ML-ENN could output non-negative values taken as the parameters for the predicted Beta distribution.

In various embodiments, the cross entropy based on the expected probability, $$\hat{p}_{ik}^t,$$

as follows:

$$l_{Beta}(\alpha_i^t, y_i^t) = \sum_{k=1}^K y_{ik}^t \log \hat{p}_{ik}^t + (1 - y_{ik}^t)\log(1 - \hat{p}_{ik}^t)$$

The probability can be represented by the belief and disbelief as follows:

$$\hat{p}_{ik}^t = \frac{b_{ik}^t}{b_{ik}^t + d_{ik}^t + 2}$$

Where $$b_{ik}^t \text{ and } d_{ik}^t$$

represents the belief and disbelief for the k-th class at time t.

Neural Networks can form their binomial opinions for the classification of a given audio segment as a Beta distribution. For the binary cross-entropy (BCE) loss, we have the Beta loss by computing its Bayes risk for the class predictor. The second loss is the derivation of the first one, in which we expand the BCE and Beta distribution.

$$\mathcal{L}_{beta} = \sum_{t=1}^T \sum_{k=1}^K \int [BCE(y_k^t, p_k^t)] \text{ Beta } (p_k^t; \alpha_k^t, \beta_k^t)dp_k^t =$$

-continued
$$\sum_{t=1}^T \sum_{k=1}^K [y_k^t(\psi(\alpha_k^t + \beta_k^t) - \psi(\alpha_k^t)) + (1 - y_k^t)(\psi(\alpha_k^t + \beta_k^t) - \psi(\beta_k^t))],$$

where T is the number of segments decomposed from an audio, K is the number of class, $BCE(y_k^t, p_k^t)=-y_k^t \log(p_k^t)-(1-y_k^t)\log(1-p_k^t)$ is the binary cross-entropy loss, and $\psi(\cdot)$ is the digamma function.

At the test stage, we consider a simple strategy to make a reliable prediction. For each class, we predict sound events happened only when belief larger than disbelief with a small vacuity:

$$\hat{y}_k^t = \begin{cases} 1, & \text{if } b_k^t > d_k^t \text{ and } u_k^t < V \\ 0, & \text{otherwise} \end{cases};$$

where $$\hat{y}_k^t \in \{0, 1\}$$

$\in \{0, 1\}$ is the model prediction for class k in segment t, and V is the vacuity threshold. A backtrack inference method that considers forward and backward information can be used to feed into ML-ENN as a sequential input to further improve early detection performance.

$$\alpha_k^t, \beta_k^t = f_k(x^{[t-m,t+n]}; \theta),$$

where m are the backward steps, and n are the forward steps. When the vacuity threshold increase, the evidence model detects the event more confidently and accurately (F1 score increase and delay decrees).

Backtrack inference can improve the SEED detection accuracy, but the waiting process (consider forward information) can cause a higher detection delay.

Multi-shift training with prior knowledge: In this step, we consider the multi-shift input to cover more early-stage information of predicted event. The loss of multi-shift can be presented as follows:

$$\mathcal{L}_{mr} = \sum_{i=1}^N \sum_{m=0}^M \sum_{t=m+1}^T l_{Beta}(\alpha_{ik}^{[t,t-m]}, y_{ik}^{[t,t-m]})$$

Where the M is the shift scale and y is the ground truth label of multiple segments.

Uncertainty Calibration: In this step, we improve the uncertainty estimation by uncertainty calibration loss as follows:

$$\mathcal{L}_{un} = \sum_{i=1}^N \sum_{m=0}^M \sum_{t=m+1}^T \sum_{k=1}^K \mathbb{1}(x_{ik}^{[t,t-m]}) \cdot U(\alpha_{ik}^{[t,t-m]}),$$

where $$\mathbb{1}(x_{ik}^{[t,t-m]}) = \begin{cases} 1, & \text{correct prediction} \\ -1, & \text{incorrect prediction} \end{cases}.$$

The uncertainty calibration loss is to help calibrating the uncertainty estimation based on the ground-truth labels. In training phase, for all correct prediction samples, we push the uncertainty decreases; for all incorrect prediction samples, the loss makes the uncertainty increase.

Real-Time Audio Streaming Data.

the real-time audio data is recorded for a sound event early detection task and training. The audio data is collected frame by frame, and usually the frame size is small enough to detect the sound event at an early stage. In our task, we usually set the frame size as 64 milliseconds.

Audio Processing. In this step, we use mel-spectrogram to parse the original wave-form audio data into the spectrogram features. Specifically, the wave form data is parsed to spectrum first by Fourier transform then map the powers of the spectrum into mel scale. After that, a log of powers operation is taken at each of the mel frequencies.

Audio Stream Processing. In this step, we parse the each audio frame data by the same method of Step 103 but the frame is padded by additional zeros as a longer window size compared to the hop size.

Audio Encoding. Based on the mel-spectrogram features generated in Step 103 and 104. We encode the audio features by state-of-the-art convolutional neural network with GRU recurrent neural network.

Evident-based Sound Event Training. Based on the audio features generated from Step 105, we apply the ground-truth onset and offset labels to train both the audio encoder and evidential sound event detection model for sound early detection task. The details of each step can be found in Section B2.

Evidential Sound Detection. Based on the evidential neural network trained in Step 106, the step generates the final predicted result for the sound event based on the belief, disbelief and uncertainty outputs. Basically, we use a simple but effective strategy: 1) when belief>disbelief and 2) uncertainty<threshold. When the two requirements are satisfied, we will predict the event happens.

Multi-label evidential neural network. In this step, we design a multi-label evidential network with a Beta distribution for each class to generate the belief, disbelief, and uncertainty results. We choose the cross entropy based on the expected probability, $$\hat{p}_{ik}^t,$$

as follows:

$$l_{Beta}(\alpha_i^t, y_i^t) = \sum\nolimits_{k=1}^K y_{ik}^t \log \hat{p}_{ik}^t + (1 - y_{ik}^t) \log(1 - \hat{p}_{ik}^t);$$

The probability can be represented by the belief and disbelief as follows:

$$\hat{p}_{ik}^t = \frac{b_{ik}^t}{b_{ik}^t + d_{ik}^t + 2};$$

Where $$b_{ik}^t \text{ and } d_{ik}^t$$

represents the belief and disbelief for the $k^{th}$ class at time t.

Figure 5:
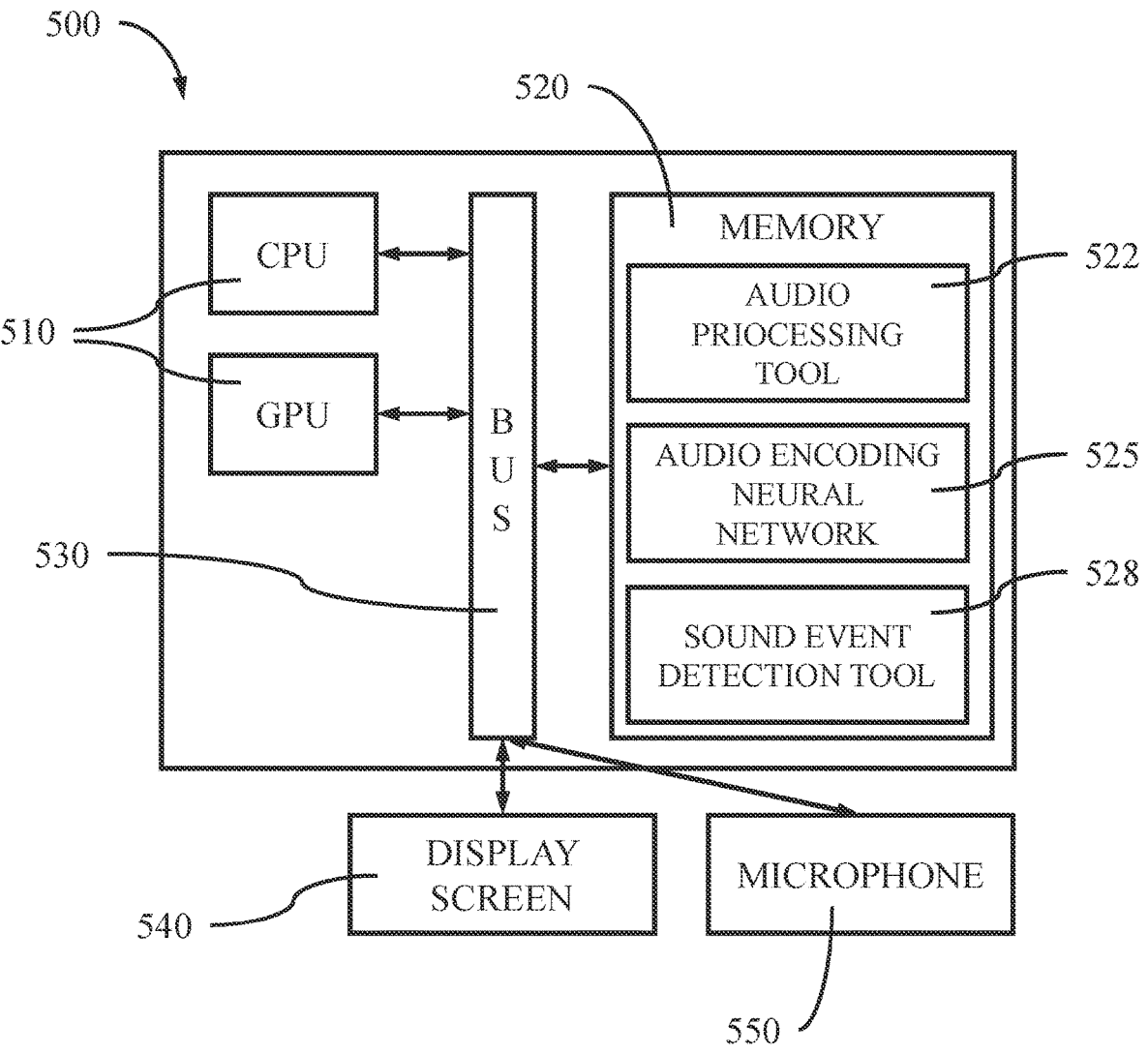
FIG. 5 is a block/flow diagram illustrating a system for Sound event detection (SED) that utilizes Subjective Logic and Evidential Uncertainty, in accordance with an embodiment of the present invention.

FIG. 5. is a block/flow diagram illustrating a system for Sound event detection (SED) that utilizes Subjective Logic and Evidential Uncertainty, in accordance with an embodiment of the present invention.

In one or more embodiments, a computer system 500 for sound event detection (SED) that utilizes subjective logic and evidential uncertainty can include one or more processors 510, for example, central processing units (CPUs), graphics processing units (GPUs), and combinations thereof, electrically coupled to a memory 520, for example, hard disk drives (HDDs), solid state drives (SSDs), random access memory (RAM), and combinations thereof, through a bus 530. In various embodiments, the computer system 500 can be configured to perform early detection of sound events to identify sound events from audio stream data. The output of the system 500 can be presented to a user on a display screen 540 electrically coupled to the system bus 530. A microphone can pick up sound events and communicate an audio stream to the audio processing tool 522 and/or sound event detection tool 528. The computer system 500 can be configured to be trained and perform the features described in the application and FIGS. 1-4.

In one or more embodiments, the system 500 for the early detection of sound events can include an audio processing tool 522, an audio encoding neural network 525 stored in the memory 520, and a sound event detection tool 528 stored in the memory 520. The audio processing tool can be further configured to apply ground truth labels to the parsed real time audio streaming data.

In one or more embodiments, the computer system 500 can include an audio processing tool 522 stored in the memory 520, where the audio processing tool 522 is trained and configured to use mel-spectrogram to parse the original wave-form audio data into the spectrogram features. This can be preprocessing of the audio data.

In one or more embodiments, the computer system 500 can include an audio encoding neural network 525 stored in the memory 520, where the audio encoding neural network 525 is a neural network that is trained and configured to automatically encode the mel-spectrogram.

In one or more embodiments, the computer system 500 can include a sound detection tool 528 stored in the memory 520, where the sound detection tool 528 is trained and configured to generate and output a final predicted result for the sound event based on the belief, disbelief and uncertainty outputs from the audio encoding neural network 525. Output can be displayed to a user on the display screen 540.

Figure 6:
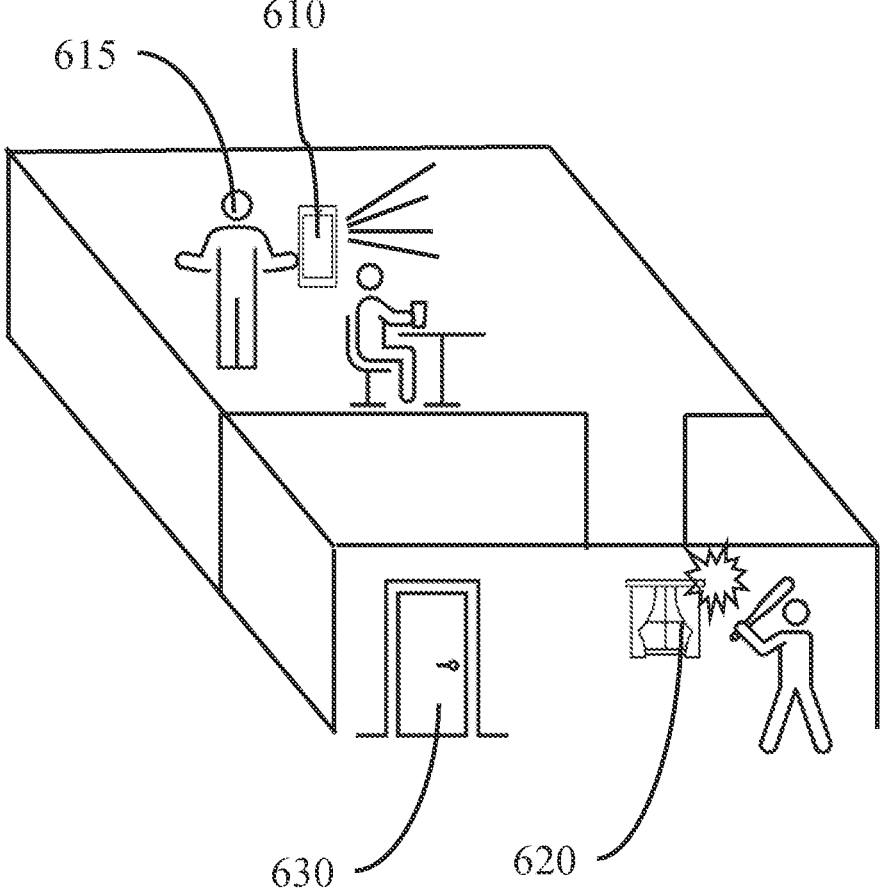
FIG. 6 is an illustration showing a person utilizing a mobile device configured to detect sound events, in accordance with an embodiment of the present invention.

FIG. 6 is an illustration showing a person utilizing a mobile device configured to detect sound events, in accordance with an embodiment of the present invention.

In various embodiments, a mobile device 610, for example, a smartphone or cellphone, can detect sounds of a security issue, such a someone breaking in by smashing in a window 620 or door 630. The sound can be detected by a method for Evidence-based Sound Event Early Detection operating on the mobile device 610 and utilizing a microphone of the mobile device 610. The Evidence-based Sound Event Early Detection can identify the occurrence of the sound and identify the related event, which can trigger a warning to the user 615 on the mobile device 610.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer implemented method for Evidence-based Sound Event Early Detection, comprising:

parsing overlapping polyphony sound from collected labeled audio corpus data and real-time audio streaming data into spectrogram features utilizing a mel-spectrogram;

extracting parsed mel-spectrograms with zero-padded frames from the collected labeled audio corpus data and real-time audio streaming data and the spectrogram features;

encoding features of the parsed mel-spectrograms using a trained neural network to obtain encoded mel-spectrograms; and detecting sound events from the overlapping polyphony sound by generating a final predicted result for the sound events with a trained neural network that reduces sound event detection delay by utilizing subjective logic with a vacuity threshold and an uncertainty calibration loss based on sums of evidential uncertainty determined based on prediction samples with corresponding strengths of binomial opinion based on belief, disbelief and uncertainty outputs from the encoded mel-spectrograms.

2. The method as recited in claim 1, further comprising applying ground truth labels to the real-time audio streaming data being parsed.

3. The method as recited in claim 2, wherein the neural network is a convolutional neural network with a gated recurrent unit (GRU) recurrent neural network.

4. The method as recited in claim 3, wherein the real-time audio data is recorded as audio frames padded with additional zeros to a predefined hop size.

5. The method as recited in claim 4, wherein the audio frames have a frame size of 64 milliseconds.

6. The method as recited in claim 5, wherein the belief and disbelief are utilized to calculate an expected probability, $\hat{p}_{ik}{}^{t}$ as $$\hat{p}_{ik}^{t} = \frac{b_{ik}^{t}}{b_{ik}^{t} + d_{ik}^{t} + 2},$$

where $$b_{ik}^{t} \text{ and } d_{ik}^{t}$$

represents the belief and the disbelief for a $k^{th}$ class at a time, t.

7. The method as recited in claim 6, wherein a cross entropy is based on the expected probability, $$\hat{p}_{ik}^{t},$$

as follows:

$$l_{Beta}(\alpha_i^t, y_i^t) = \sum_{k=1}^{K} y_{ik}^t \log \hat{p}_{ik}^t + (1 - y_{ik}^t) \log(1 - \hat{p}_{ik}^t).$$

8. The method as recited in claim 7, wherein an uncertainty estimation is calculated by the uncertainty calibration loss as:

$$\mathcal{L}_{un} = \sum_{i=1}^{N} \sum_{m=0}^{M} \sum_{t=m+1}^{T} \sum_{k=1}^{K} \mathbb{1}(x_{ik}^{[t,t-m]}) \cdot U(\alpha_{ik}^{[t,t-m]}),$$

-continued where $$\mathbb{1}(x_{ik}^{[t,t-m]}) = \begin{cases} 1, & \text{correct prediction} \\ -1, & \text{incorrect prediction} \end{cases}.$$

9. The method as recited in claim 8, wherein the real-time audio streaming data is collected as audio segments with time stamps.

10. The method as recited in claim 1, further comprising notifying entities of an undesirable sound event related to a security issue for a building based on the final predicted result.

11. The method as recited in claim 1, further comprising training a neural network with the uncertainty calibration loss to obtain the trained neural network.

12. A computer system for Evidence-based Sound Event Early Detection, comprising:

one or more processors;

a display screen coupled to the one or more processors through a bus; and memory coupled to the one or more processors through the bus, wherein the memory includes:

an audio processing tool that parses overlapping polyphony sound from collected labeled audio corpus data and real-time audio streaming data into spectrogram features by utilizing a mel-spectrogram and extracts parsed mel-spectrograms with zero-padded frames from the collected labeled audio corpus data and real time audio streaming data and the spectrogram features, an audio encoding tool that encodes features of the parsed mel-spectrograms using a trained neural network to obtain encoded mel-spectrograms, and a sound detection tool that detects sound events from the overlapping polyphony sound and generates a final predicted result for the sound events with the trained neural network that reduces sound event detection delay by utilizing subjective logic with a vacuity threshold and an uncertainty calibration loss based on sums of evidential uncertainty determined based on prediction samples with corresponding strengths of binomial opinion based on the belief, disbelief and uncertainty outputs from the encoded mel-spectrograms.

13. The computer system as recited in claim 12, wherein the audio processing tool is further configured to apply ground truth labels to the real-time audio streaming data being parsed.

14. The computer system as recited in claim 13, wherein the neural network is a convolutional neural network with a gated recurrent unit (GRU) recurrent neural network.

15. The computer system as recited in claim 14, wherein the real-time audio data is recorded as audio frames padded with additional zeros to a predefined hop size.

16. The computer system as recited in claim 15, wherein the audio frames have a frame size of 64 milliseconds.

17. The computer system as recited in claim 16, wherein the belief and disbelief are utilized to calculate an expected probability, $\hat{p}_{ik}{}^{t}$ as $$\hat{p}_{ik}^{t} = \frac{b_{ik}^{t}}{b_{ik}^{t} + d_{ik}^{t} + 2},$$

where $$b_{ik}^t \text{ and } d_{ik}^t$$

represents the belief and the disbelief for a $k^{th}$ class at a time, t.

18. The computer system as recited in claim 17, wherein the cross entropy is based on a expected probability, $$\hat{p}_{ik}^t,$$

as follows:

$$l_{Beta}(\alpha_i^t, y_i^t) = \sum_{k=1}^{K} y_{ik}^t \log \hat{p}_{ik}^t + (1 - y_{ik}^t)\log(1 - \hat{p}_{ik}^t).$$

19. The computer system as recited in claim 18, wherein an uncertainty estimation is calculated by the uncertainty calibration loss as:

$$\mathcal{L}_{un} = \sum_{i=1}^{N} \sum_{m=0}^{M} \sum_{t=m+1}^{T} \sum_{k=1}^{K} \mathbb{I}(x_{ik}^{[t,t-m]}) \cdot U(\alpha_{ik}^{[t,t-m]}),$$

where $$\mathbb{I}(x_{ik}^{[t,t-m]}) = \begin{cases} 1, & \text{correct prediction} \\ -1, & \text{incorrect prediction} \end{cases}.$$

20. The computer system as recited in claim 19, wherein the real-time audio streaming data is collected as audio segments with time stamps.

* * * * *